US006184178B1

United States Patent
Baluais et al.

(10) Patent No.: US 6,184,178 B1
(45) Date of Patent: Feb. 6, 2001

(54) CATALYST SUPPORT WITH BASE OF SILICON CARBIDE WITH HIGH SPECIFIC SURFACE AREA IN GRANULATED FORM HAVING IMPROVED MECHANICAL CHARACTERISTICS

(75) Inventors: Gerard Baluais, Passy; Benoist Ollivier, Voiron, both of (FR)

(73) Assignee: Pechiney Recherche, Paris (FR)

(*) Notice: Under 35 U.S.C. 154(b), the term of this patent shall be extended for 0 days.

(21) Appl. No.: 09/331,891

(22) PCT Filed: Jan. 9, 1998

(86) PCT No.: PCT/FR98/00030

§ 371 Date: Jul. 27, 1999

§ 102(e) Date: Jul. 27, 1999

(87) PCT Pub. No.: WO98/30328

PCT Pub. Date: Jul. 16, 1998

(30) Foreign Application Priority Data

Jan. 13, 1997 (FR) .................................................. 97 00425

(51) Int. Cl.⁷ ................................................. B01J 27/224
(52) U.S. Cl. ............................................. 502/439; 502/178
(58) Field of Search ...................................... 502/439, 178

(56) References Cited

U.S. PATENT DOCUMENTS

| | | | |
|---|---|---|---|
| 4,162,167 | * 7/1979 | Enomoto et al. | 106/44 |
| 4,547,430 | * 10/1985 | Goldberger et al. | 428/404 |
| 4,818,732 | * 4/1989 | Fox et al. | 501/81 |
| 5,340,417 | * 8/1994 | Weimer et al. | 148/513 |
| 5,460,759 | * 10/1995 | Dubots | 264/29.7 |

FOREIGN PATENT DOCUMENTS

| | | | |
|---|---|---|---|
| 35 16 587 | * 12/1985 | (DE) . | |
| 0 511 919 | * 11/1992 | (EP) . | |
| 0 543 752 | * 5/1993 | (EP) . | |
| 0 624 560 | * 11/1994 | (EP) . | |
| WO 94/17900 | * 8/1994 | (WO) | B01D/53/34 |

* cited by examiner

Primary Examiner—Steven P. Griffin
Assistant Examiner—Christina Ildebrando
(74) Attorney, Agent, or Firm—Dennison, Scheiner, Schultz & Wakeman

(57) ABSTRACT

Catalyst support in granular form with a SiCβ crystallite base and a high specific surface area having improved mechanical characteristics. The porosity of the support is between 0.001 and 1 um in size and the crystallinity of the support is determined by:

a full width at half maximum of diffraction X rays, corresponding to plane [2 2 0] of the SiCβ crystallites, of between 0.15 and 0.60°, angle 2θ of Bragg's law; and a bidimensional peak height [1 0] corresponding to directions [1 0] normalized by the integrated intensity of the peak of plane [2 2 0] of between 0.15 and 0.40.

10 Claims, 1 Drawing Sheet

CATALYST SUPPORT WITH BASE OF SILICON CARBIDE WITH HIGH SPECIFIC SURFACE AREA IN GRANULATED FORM HAVING IMPROVED MECHANICAL CHARACTERISTICS

FIELD OF THE INVENTION

The invention relates to a silicon carbide based catalyst support with a high specific surface area in the form of particles having improved mechanical characteristics through improved crystallinity.

DESCRIPTION OF RELATED ART

From patent FR 2657603 it is known how to obtain catalyst supports, particularly in SiC, with a high specific surface area (more than 15 m2/g) coming from a first group of pores whose average diameter is between 1 and 100 $\mu$m giving the gas access to a second group of pores with an average diameter of less than 0.1 $\mu$m responsible for the specific surface area and catalytic activity.

This support is obtained by mixing a powder of Si or one of its reducible compounds in a polymer or polymerizable organic resin and possibly with additives, giving the mixture its form, reticulating and polymerizing the resin, obtaining a porous frame of carbon and Si or its compound by carbonizing in a non-oxidising atmosphere at a temperature of between 500 and 1000° C., and finally carburizing Si at a temperature of between 1000 and 1400° C. again in a non-oxidising atmosphere.

It is also known from patent FR 2684091 how to obtain a metallic carbide, in particular of Si, by causing to react in an oven in a flow of inert gas at atmospheric pressure a mixture of carbon having a specific surface area of at least 200 m2/g and a volatile Si compound at a temperature of between 900 and 1400° C. in order to reduce and carburize said compound. With activated charcoal, whose porosity comprises macropores between nodules with an average diameter of 2 to 5 $\mu$m, mesopores between particles with an average diameter of 0.003 and 0.005 $\mu$m and microporosity of particles with an average diameter of between 0.0005 and 0.015 $\mu$m, a carbide is obtained whose macroporosity has been preserved, the size of the mesopores has been multiplied by approximately 3 and whose microporosity has disappeared.

Patent FR 2684092 describes a SiC foam obtained by a method of similar type to the preceding method, through reaction of a volatile Si compound on a foam of activated carbon. This activated carbon foam may be produced using a polyurethane foam reinforced by impregnation with a resin and setting of the resin, the reinforced foam being subsequently carbonized to give a carbon foam which is activated.

The carbide foam obtained has a specific surface area of at least 20 m2/g attributable in particular to macropores comprising edges whose lengths may vary from 50 to 500 $\mu$m, and chiefly to mesopores whose diameter, as previously, has been multiplied by a factor of approximately 3 in relation to the pore diameter of the activated carbon foam which lies between 0.002 and 0.02 $\mu$m.

Its specific mass is between 0.03 and 0.1 g/cm3.

Finally from patent FR 2705340 a method is known of how to obtain a silicon carbide foam as a catalyst support, resembling the method of the first patent described above FR 2657603. It consists of using a polyurethane foam, impregnating the foam with a suspension of Si in an oxygenated organic resin, of polymerizing the resin, carbonizing simultaneously the foam and the resin at between 250 and 1000° C. in an inert atmosphere and of carburizing the Si up to a temperature of between 1300 and 1400° C. again in an inert atmosphere.

The foam catalyst support has a specific surface area of more than 10 m2/g and bimodal porosity comprising macropores with an average diameter of between 100 and 150 $\mu$m and mesopores of between 0.0275 and 0.035 $\mu$m.

Also, a foam is described which may be used as a diesel engine filter which has only maintained macropores of between 100 and 150 $\mu$m and whose mesoporosity is very low after carburization at a higher final temperature of between 1300° and 1600° C.

The catalyst supports described above may be used in granular form in particular for chemical or petrochemical catalytic reactions, for example hydrogenation, dehydrogenation, isomerization, decyclization of hydrocarbides with good results.

However, during their industrial use, these particle supports are subjected to considerable mechanical stress due for example to the fact that they are used in the form of beds or are repeatedly handled or stored.

The applicant has therefore set out to improve the mechanical characteristics of these supports in granular form so that they can resist against the above-mentioned stresses without impairing their catalytic properties.

SUMMARY OF THE INVENTION

The invention is a catalyst support in granular form essentially made up of SiC$\beta$ crystallites, having a high specific surface area, that is typically of at least 5 m2/g, and having improved mechanical characteristics, characterized in that its porosity essentially comprises pores whose average diameter is between 0.001 and 1 $\mu$m, preferably 0.5 $\mu$m, and in that its crystallinity is determined by:

- a Full Width at Half Maximum of diffraction X rays, corresponding to plane [2 2 0] of the SiC$\beta$ crystallites, that is between 0.15 and 0.60°, angle 2$\theta$ of Bragg's law
- a bidimensional peak height h[1 0], corresponding to directions [1 0] normalized by the integrated intensity of the peak of plane [2 2 0], that is between 0.15 and 0.40.

These types of measurement are known and have been used according to the methods described by (1) P. J. Schields: Testing a thermostatistical theory of stacking fault abundance and distribution in silicon carbide using SPRD, HRTEM and NMR PhD thesis, Arizona State University, 1994

(2) M M J Treacy, J M Nowsam and M W Deom: A general recursion method for calculating diffracted intensities from crystals containing planar faults. Proc Roy Soc London, A433, 499–520 (1991).

The full width at half maximum of rays [2 2 0] of the SiC$\beta$ cubic crystals is given in 2$\theta$ degrees generally corresponding to the K$\alpha$ radiation of copper (CuK$\alpha$); it is representative of the size of the coherent areas of the product's crystallites.

The full widths at half maximum of the diffraction peaks are typically determined under the following measurement conditions: aperture and antiscattering slits of 1°; detector diaphragms of 0.06°. The heights at half width given above are not adjusted for instrument widening.

For full width at half maximum values below the limit of 0.15°, cyrstallite size becomes too great, the specific surface area of the support is lost and the mechanical resistance of the granules strongly decreases.

One explanation for this loss of mechanical resistance could be lack of bonds between the SiC particles owing to the fact that during the heat treatment described below the carbon frame which serves as link has not been converted into SiC but on the contrary may have been partly converted into CO to react with the grains of Si dispersed in said frame.

For values of more than 0.6° corresponding to crystallinity that is too low, the specific surface area may be high but the mechanical resistance of the granules is again insufficient. In this case the explanation may be that this insufficient mechanical resistance is due to insufficient SiC crystallite size.

The height of the bidimensional peak normalized by the integrated intensity of the peak of plane [2 2 0], noted [h(10)/I (220)], is representative of the stacking fault abundance in the cubic structure of the SiC. When the height of this peak is too short, the specific surface area is lost, and when it is too great it is found that mechanical resistance becomes insufficient, probably due to lack of coherency in the stacking of the crystallites connected with the specific surface area obtained.

The specific surface area of the granules is at least 5 m2/g but is usually more than 10 m2/g and in practice between 10 and 50 m2/g.

The non-packed density of the granules typically lies between 0.5 and 0.9, preferably between 0.6 and 0.8.

Granule size may vary to a large extent; it is generally less than 5 mm in diameter for the support to be efficient, and more than 0.4 mm to give good particle access to the treated flow and to minimize head losses.

Improved mechanical resistance is measured by the resistance to crushing and generally lies between 1 and 20 MPa, and preferably over 10 MPa, using a so-called<<Bulk Crushing Strength>> test. This test conducted in accordance with standard ASTM D 4179-88a, consists of placing a determined sample mass in a standard size metallic test tube. This sample is subjected to increasing compression levels using a piston operated by a mechanical press.

The fines produced at the different pressures are separated by screening and weighed.

Crushing strength corresponds to the pressure at which 0.5% of fines are produced. This value is obtained by interpolation on a graph plotted using the percentage of fines obtained at the various pressures.

To obtain the SiC based catalyst support of the invention, the following method of procedure may be used which is derived from that of patent FR 2657603 cited above.

The starting point is a thermosetting resin with a high carbon content, preferably comprising oxygen with a mass percentage of oxygen of at least 15%, for example of furfurylic type (oxygen content of at least 25%), or phenol, carboxyl type . . . , to which Si powder and advantageously activated carbon powder is added generally having a specific surface area of more than 10 m2/g or even better of more than 40 m2/g; additives may also be added of reticulant type (0.5 to 10% by weight in relation to the resin) or of porogenous, plastifying, lubricant type for example organic or even water, polar or non-polar solvent, the reticulant contributing in particular to obtaining good carbon yield during heat treatment.

The resin may be replaced by pitch.

The Si powder typically has an average particle size of less than 500 µm, preferably of between 0.1 and 100 m. The Si may, at least in part, be replaced by $SiO_2$, for example by silica fumes which are residues from the production of Si and are essentially made up of amorphous $SiO_2$.

The mixture is shaped, for example by extrusion to give it homogeneity and sufficient density.

Any additives are eliminated by heating and the resin or pitch is reticulated or set at a temperature of up to 250° C., the treatment time generally lasting more than 20 min.

It is important to give care to reticulation to improve carbon yield through sufficiently long baking.

Typically the temperature can be raised from 120° C. to 200° C. over a period of between 15 minutes and 1 h and the level of 200±20° C. can be maintained for a period of between 1 and 2 h.

Heat treatment is conducted in a single stage in a slightly oxidising atmosphere in relation to the Si, of CO type, at a temperature of between 1300 and 1450° C. to carbonize the organic matter and obtain the carbide, eventually after reduction of $SiO_2$, the reactions being conducted at all times in solid or gaseous phase, preferably at between 1300 and 1400° C.

Optionally the excess carbon can be eliminated by combustion in an oxidising atmosphere at a temperature of between 500 and 1000° C., usually at around 700° C.

It is important that the heat characteristics are such that the carbonization phase is conducted rapidly, that is to say that the rate at which the temperature is raised to 100° C. is between 1 and 100° C./min, preferably between 20 and 100° C./min, in order to increase the carbon yield and to obtain a denser carbon frame which, after conversion into SiC, will give better crystallinity allowing for improved mechanical resistance without impairing specific surface area. Advantageously operations are carried out at atmospheric pressure.

To obtain the desired crystallinity, the slightly oxidising atmosphere in relation to Si is achieved by maintaining a partial CO pressure of between 1 and 500 mbar. With this type of atmosphere it is possible to convert the carbon frame into SiC and not the Si grains into SiC and to maintain a high specific surface area while achieving a good reaction yield, the latter contributing to the achievement of improved mechanical characteristics owing to the high carbonization level obtained previously.

The granules of silicon carbide may be obtained in a heat treatment oven of batch or continuous type, the atmosphere containing CO being able to circulate in co-flowing with but preferably in counter flow.

The time of heat treatment is advantageously between 15 min and 3 h, preferably between 30 min and 1.5 h, in particular if the process is conducted in a continuous type oven, when the product stays for at least 1 h at 1300° C. or more; this period is shorter the higher the final temperature (while remaining below 1450° C. preferably 1400° C., as seen above).

This atmosphere is generally obtained with the oxygen contained in the initial matter and its value is controlled using a flow of inert gas, for example of argon type.

Under these conditions, for obtaining a SiC granule that simultaneously has a high specific surface area and improved mechanical resistance with a conversion rate of Si of at least 95%., it is preferable for the time of heat treatment to be at least 20 mim (in particular at 1300° C.) and no more than 3 h (in particular at 1450° C.).

The type of organic matter can also be varied (for example their $O_2$ content and their carbon yield which must be high as seen previously), or the mixture proportions, or operating conditions to improve the carbon yield for example.

The final product does not contain any residual Si (less than 0.56 by weight detected by X ray diffraction).

EXAMPLES

Example 1

Figure 1:
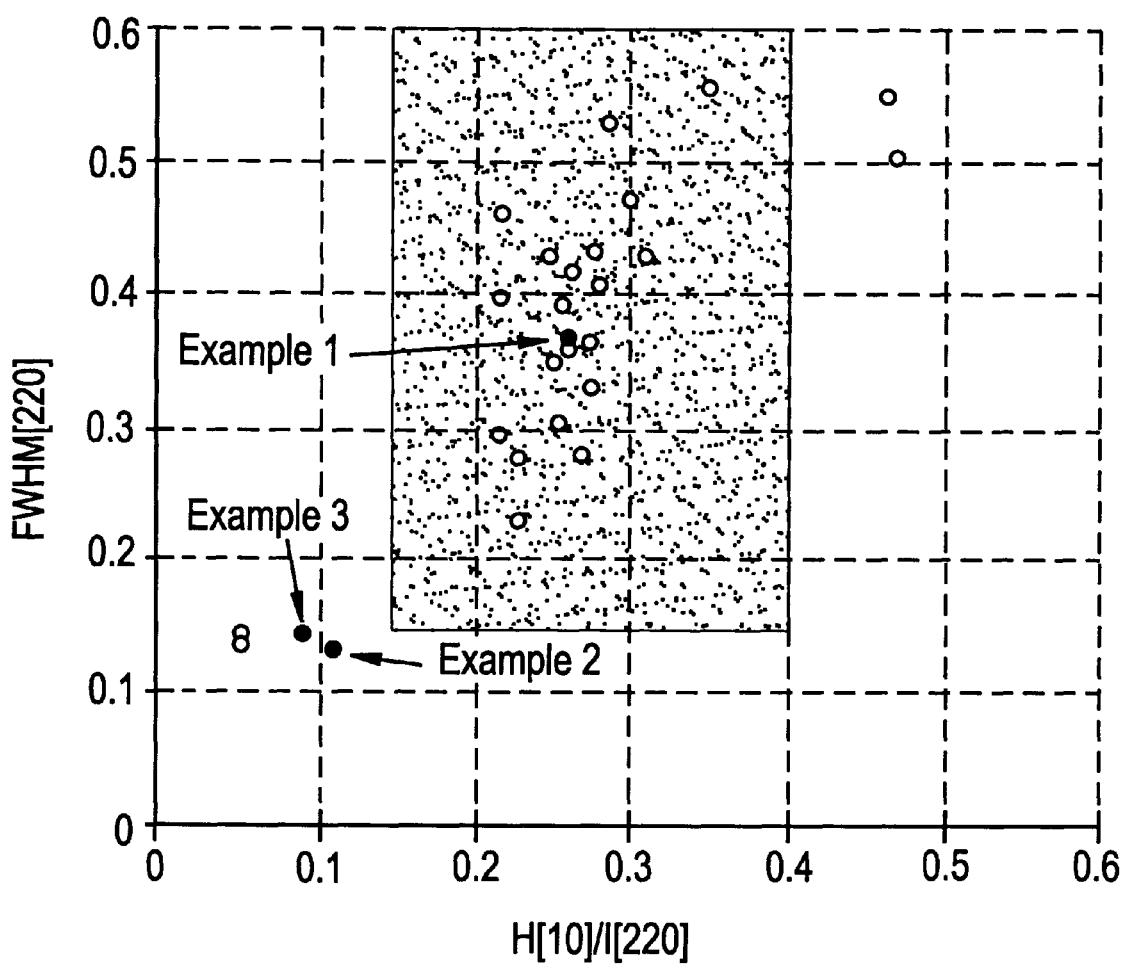
FIG. 1 is an X-ray diffraction diagram for the examples of the invention.

This example illustrates how a catalyst support granule of the invention can be obtained.

The following were mixed together:

500 g furfurylic resin 1 800 g Si 860 g carbon black with a specific surface area BET 100 m2/g 25 g of Hexamethylenetetramine (reticulant)

This mixture was extruded to obtain rounded lengths 1 mm in diameter and 3 mm long which were reticulated at 200° C.

The particles obtained were heated to 1400° C. at a temperature rise rate of 5° C./min in a flow of argon at atmospheric pressure, whose flow was adjusted to maintain a partial CO pressure of approximately 10 mbar.

After complete Si carburization, the excess carbon was burnt at 700° C. in an oxidising atmosphere.

The SiC catalyst support obtained has a specific surface area BET of 10 m2/g.

In the X ray diffraction diagram, the full width at half maximum of ray [2 2 0] is 0.36° and the standardized height h(10)/I(220) of the bidimensional peak is 0.26.

Crushing strength is 14 MPa.

Example 2

By way of comparison, this example concerns a granule with a high specific surface area but with insufficient mechanical characteristics.

The following were mixed together:

500 g resin 1800 g Si 25 g HMT (hexamethylene tetramine)

510 g carbon black

The mixture was reticulated and subjected to heat treatment as in example 1, with the exception of the partial CO pressure which was maintained at 600 mbar.

The product obtained has a specific surface area BET of 7.7 m2/g, in the same region as that of the SiC support obtained in example 1.

In the X ray diffraction diagram, the full width at half maximum of ray [2 2 0] is 0.13° and the standardized height h(10)/I(220) of the bidimensional peak is 0.11.

Its specific surface area is acceptable (7.7 m2/) but more especially its crushing strength is unacceptable: 0.3 MPa.

Example 3

This is also a comparative example.

The initial composition was the same as in examples 1 and 2 but the carbon black was omitted.

Operating conditions were the same as in example 1, but the partial CO pressure was maintained at 550 mbar.

The carbon obtained has a specific surface area BET of 4.3 m2/g and a crushing strength of 0.1 MPa, which are insufficient values.

FIG. 1 shows a set of results within and outside the limits of the invention. The X-axis gives the height of the bidimensional peak h [1 0] normalized by the integrated intensity of the peak of plane [2 2 0] and the Y-axis shows the full width at half maximum (FWHM) in degrees 2θ (CuKα) of the ray corresponding to plane [2 2 0].

What is claimed is:

1. Catalyst support in granular form with a SiCβ crystallite base and a high specific surface area, comprising a porosity consisting essentially of pores of sizes between 0.001 and 1 μm, and a crystallinity determined by:

a full width at half maximum of diffraction X rays, corresponding to plane [2 2 0] of the SiCβ crystallites, of between 0.15 and 0.60°, angle 2θ of Bragg's law, and a bidimensional peak height [1 0] corresponding to directions [1 0] normalized by an integrated intensity of a peak of plane [2 2 0] of between 0.15 and 0.40.

2. Granular support in accordance with claim 1, having a specific surface area greater than 5 $m^2/g$.

3. Granular support in accordance with claim 2, having a specific surface area greater than 10 $m^2/g$.

4. Granular support in accordance with claim 1, having a crushing strength greater than 1 MPa.

5. Granular support in accordance with claim 1, having an unpacked density between 0.5 and 0.9.

6. Granular support in accordance with claim 1, containing less than 0.5% by weight residual Si detected by X-ray diffraction.

7. Method for obtaining a carbide catalyst support in granular form with a SiCβ crystallite base and a high specific surface area, comprising a porosity consisting essentially of pores of size between 0.001 and 1 μm, and a crystallinity determined by:

a full width at half maximum of diffraction X rays, corresponding to plane [2 2 0] of the SiCβ crystallites, of between 0.15 and 0.60°, angle 2θ of Bragg's law a bidimensional peak height [1 0] corresponding to directions [1 0] normalized by an integrated intensity of a peak of plane [2 2 0] of between 0.15 and 0.40, comprising the steps of:

mixing a thermosetting resin or pitch with at least one Si and/or $SiO_2$ powder, and optionally with additives, to form a mixture;

shaping the mixture obtained;

setting the resin or pitch in the shaped mixture; and heat treating the shaped mixture with set resin or pitch in a slightly oxidizing atmosphere at atmospheric pressure at a temperature of between 1300 and 1450° C. to carbonize the resin or pitch, optionally reducing $SiO_2$ in the heat treated mixture, and carburizing the silicon in the heat treated mixture, the carbonizing, reducing and carburizing being carried out only in a solid or gaseous phase.

8. Method in accordance with claim 7, wherein the mixture comprises at least one additive selected from the group consisting of activated carbon, reticulant, porogenous agent, plastifying agent, lubricant, and solvent.

9. Method in accordance with claim 7, wherein the Si and/or $SiO_2$ powder in the mixture is fumed silica.

10. Method in accordance with claim 7, wherein the slightly oxidizing atmosphere comprises a partial pressure of CO between 1 and 500 mbar.

* * * * *